CIRCUIT ARRANGEMENT COMPRISING A PHOTOTRANSISTOR

Filed Jan. 23, 1956

INVENTOR
EBERTUS WILLEMS
ERIK NETTEN
BY [signature]
AGENT

United States Patent Office 2,948,815
Patented Aug. 9, 1960

2,948,815

CIRCUIT ARRANGEMENT COMPRISING A PHOTOTRANSISTOR

Ebertus Willems, Eindhoven, and Erik Netten, Rotterdam, Netherlands, assignors, by mesne assignments, to North American Philips Company, Inc., New York, N.Y., a corporation of Delaware Filed Jan. 23, 1956, Ser. No. 560,598
Claims priority, application Netherlands Feb. 18, 1955
8 Claims. (Cl. 250—211)

The invention relates to a circuit arrangement comprising a photo-transistor to produce an electric signal varying linearly with the intensity of the exposure of the photo-transistor. It is known with photocell-amplifiers to supply a negative feed-back voltage proportional to the output signal to the photocell either in series with the supply of the photo-cell or to a grid of the cell. However, a sufficient linearisation of the output signal as a function of the exposure intensity is not obtained in this way, since the current passing through a photocell exhibits, as a function of the exposure intensity, a relationship quite different from that as a function of the voltage across the photocell or that across its grid.

The invention employs a photo-transistor, for example a crystal triode, the collector current of which varies with the exposure intensity of the crystal. It has the feature that to the emitter-base path of the transistor is supplied a negative feed-back current proportional to the output signal produced by the transistor.

The invention is based on the recognition of the fact that the charge carriers set free in the base zone of the transistor are on the one hand proportional to the exposure intensity of the transistor and on the other hand to the current supplied to the emitter-base path. Consequently, by supplying to this emitter-base path in negative feed-back sense a current proportional to the output signal, the relationship between the free charge carriers in the base zone and the output signal and hence between the output signal and the exposure intensity is linearized. If, on the contrary, for example between the base electrode and the emitter electrode of the transistor were supplied a voltage proportional to the output signal, no linear relationship between the output signal and the exposure intensity will, as a rule, occur due to the variable input resistance of the transistor.

In order that the invention may be readily carried into effect, it will now be described with reference to the accompanying drawing, wherein.

Figure 1:
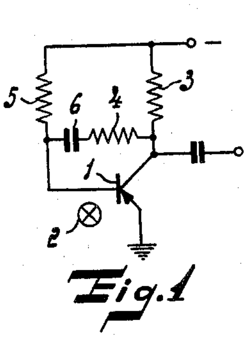
Fig. 1 is a schematic diagram of an embodiment of the circuit arrangement of the present invention.

In Fig. 1 a photo-transistor 1 is irradiated by a variable source of light 2, which is shown diagrammatically by an incandescent lamp, but which may, for example, be constituted by a sound film scanned by a ribbon-shaped beam. The source of light 2 sets free mobile charge carriers in the base zone of the photo-transistor 1, which must therefore not be coated by a light-absorbing layer at least on the side of the source 2. Thus the transistor is traversed by a collector current which produces an electric signal at an output resistor 3.

It is found that this electric signal does not vary linearly with the exposure intensity of the transistor 1. In order to linearize the relationship between the output signal and the exposure intensity, a resistor 4 is connected between the collector electrode and the base electrode of the transistor. The resistor 4, is high with respect to the base input impedance of the transistor, so that a negative feed-back current is supplied to the base electrode, which is proportional to the output signal across the resistor 3, so that in accordance with the aforesaid idea the desired improvement is obtained. The resistor 5 and the blocking capacitor 6 serve in this case for separate adjustment of the base bias current.

The impedances 3, 4, 5 and/or 6 may, of course, be replaced by impedances varying with the signal frequency, in which case the output signal produced, though it varies with the signal frequency, will continue to vary linearly with the signal amplitude.

Figure 2:
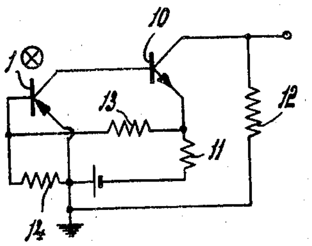
Fig. 2 is a schematic diagram of another embodiment of the circuit arrangement of the present invention.

In Fig. 2 the photo-transistor 1 is followed by an amplifier comprising a transistor 10 of opposite conductivity type, the emitter circuit of which includes a resistor 11, the voltage of which is substantially proportional to the output signal produced across the output resistor 12. The voltage across the resistor 11 is applied via a comparatively high resistor 13 to the base electrode of the transistor 1. A resistor 14 may, in this case, serve to adjust the base bias current.

Figure 3:
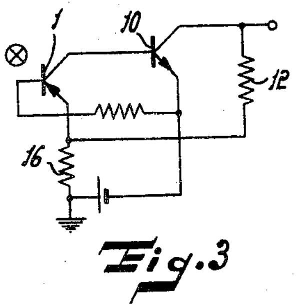
Fig. 3 is a modification of the embodiment of Fig. 2.

Fig. 3 shows a variant of the embodiment shown in Fig. 2, wherein the collector current of the transistor 10 traverses in series the output resistor 12 and a resistor 16 included in the emitter circuit of the transistor 1. Thus again a negative feed-back current proportional to the output signal across the resistor 12 is supplied to the emitter electrode of the transistor 1, so that in accordance with the aforesaid recognition the relationship between the output signal and the exposure intensity of the transistor 1 is linearized.

Figure 4:
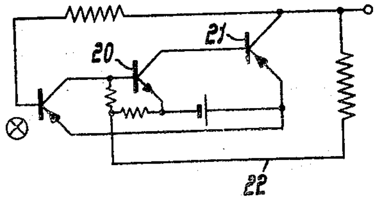
Fig. 4 is another modification of the embodiment of Fig. 2.

The photo-transistor may, of course, also be followed by other amplifiers. In order to increase the sensitivity, a positive feed-back voltage or current could be supplied to the emitter-base path of the transistor. In such event, however the linearity of the arrangement would then be reduced. However, as is shown in Fig. 4, if the following amplifier 20, 21 is positively fed back in itself via the conductor 22, an increased sensitivity may be obtained, while, at the same time, a satisfactory linearity and stability are maintained.

What is claimed is:

1. A circuit arrangement for linearizing the output signal of a phototransistor in response to radiations impinging thereon, comprising a phototransistor having emitter and base electrodes defining an input electrode system and a collector electrode defining with one of said first mentioned electrodes an output electrode system, said phototransistor undergoing variations in collector current in response to radiations impinging thereon, means for impinging radiations on said phototransistor, means for deriving an output signal from said output electrode system, and feedback means coupled to said output system and input electrode system for applying to said input electrode system a negative feedback current proportional to said output signal, said output signal varying substantially linearly with the intensity of said radiations due to the application of said feedback current.

2. A circuit arrangement for linearizing the output signal of a phototransistor in response to radiations impinging thereon, comprising a phototransistor having emitter and base electrodes defining an input electrode system having an input impedance and a collector electrode defining with one of said first mentioned electrodes an output electrode system, said phototransistor undergoing variations in collector current in response to radiations impinging thereon, means for impinging radiations on said phototransistor, means for deriving an output signal from said output electrode system, and feedback means coupled to said output system for applying to said input electrode system a negative feedback current proportional to said output signal, said output signal varying substantially linearly with the intensity of said radiations due to the application of said feedback current, said feedback means comprising a resistor having a resistance value which is substantially high relative to the value of said input impedance and means coupling said resistor between said collector and base electrodes.

3. A circuit arrangement for linearizing the output signal of a phototransistor in response to radiations impinging thereon, comprising a phototransistor having emitter and base electrodes defining an input electrode system having an input impedance and a collector electrode defining with one of said first-mentioned electrodes an output electrode system, said phototransistor undergoing variations in collector current in response to radiations impinging thereon, means for impinging radiations on said phototransistor, means for deriving an output signal from said output electrode system, and feedback means coupled to said output system for applying to said input electrode system a negative feedback current proportional to said output signal, said output signal varying substantially linearly with the intensity of said radiations due to the application of said feedback current, said feedback means comprising a resistor having a resistance value which is substantially high relative to the value of said input impedance and means coupling said resistor between said collector and emitter electrodes.

4. A circuit arrangement for linearizing the output signal of a phototransistor in response to radiations impinging thereon, comprising a phototransistor of one conductivity type having emitter and base electrodes defining an input electrode system and a collector electrode defining with one of said first-mentioned electrodes an output electrode system, said phototransistor undergoing variations in collector current in response to radiations impinging thereon, means for impinging radiations on said phototransistor, means for deriving an output signal from said output electrode system, and feedback means coupled to said output system for applying to said input electrode system a negative feedback current proportional to said output signal, said output signal varying substantially linearly with the intensity of said radiations due to the application of said feedback current, said output signal deriving means and said intercoupling means including an amplifier comprising a transistor of opposite conductivity type from said phototransistor.

5. A circuit arrangement for linearizing the output signal of a phototransistor in response to radiations impinging thereon, comprising a phototransistor of one conductivity type having emitter and base electrodes defining an input electrode system having an input impedance and a collector electrode defining with one of said first-mentioned electrodes an output electrode system, said phototransistor undergoing variations in collector current in response to radiations impinging thereon, means for impinging radiations on said phototransistor, means for deriving an output signal from said output electrode system, and feedback means coupled to said output system for applying to said input electrode system a negative feedback current proportional to said output signal, said output signal varying substantially linearly with the intensity of said radiations due to the application of said feedback current, said feedback means comprising a resistor having a resistance value which is substantially high relative to the value of said input impedance and means coupling said resistor between said collector and base electrodes, said output signal deriving means and said resistor coupling means including an amplifier comprising a transistor of opposite conductivity type from said phototransistor.

6. A circuit arrangement for linearizing the output signal of a phototransistor in response to radiations impinging thereon, comprising a phototransistor of one conductivity type having emitter and base electrodes defining an input electrode system having an input impedance and a collector electrode defining with one of said first-mentioned electrodes an output electrode system, said phototransistor undergoing variations in collector current in response to radiations impinging thereon, means for impinging radiations on said phototransistor, means for deriving an output signal from said output electrode system, and feedback means coupled to said output system for applying to said input electrode system a negative feedback current proportional to said output signal, said output signal varying substantially linearly with the intensity of said radiations due to the application of said feedback current, said feedback means comprising a resistor having a resistance value which is substantially high relative to the value of said input impedance and means coupling said resistor between said collector and emitter electrodes, said output signal deriving means and said resistor coupling means including an amplifier comprising a transistor of opposite conductivity type from said phototransistor.

7. A circuit arrangement for linearizing the output signal of a phototransistor in response to radiations impinging thereon, comprising a phototransistor having emitter and base electrodes defining an input electrode system and a collector electrode defining with one of said first-mentioned electrodes an output electrode system, said phototransistor undergoing variations in collector current in response to radiations impinging thereon, means for impinging radiations on said phototransistor, means for deriving an output signal from said output electrode system, and feedback means coupled to said output system and input electrode system for applying to said input electrode system a negative feedback current proportional to said output signal, said output signal varying substantially linearly with the intensity of said radiations due to the application of said feedback current, said output signal deriving means and said intercoupling means including an amplifier comprising an input, an output and means intercoupling said output and input in a manner to produce a positive feedback therein.

8. A circuit arrangement for linearizing the output signal of a phototransistor in response to radiations impinging thereon, comprising a phototransistor having emitter and base electrodes defining an input electrode system having an input impedance and a collector electrode defining with one of said first-mentioned electrodes an output electrode system, said phototransistor undergoing variations in collector current in response to radiations impinging thereon, means for impinging radiations on said phototransistor, means for deriving an output signal from said output electrode system, and feedback means coupled to said output system for applying to said input electrode system a negative feedback current proportional to said output signal, said output signal varying substantially linearly with the intensity of said radiations due to the application of said feedback current, said feedback means comprising a resistor having a resistance value which is substantially high relative to the value of said input impedance and means coupling said resistor between said collector and base electrodes, said output signal deriving means and said resistor coupling means including an amplifier comprising an input, an output and means intercoupling said output and input in a manner to produce a positive feedback therein.

References Cited in the file of this patent

UNITED STATES PATENTS

| | | |
|---|---|---|
| 2,544,211 | Barton | Mar. 6, 1951 |
| 2,579,336 | Rack | Dec. 18, 1951 |
| 2,701,309 | Barney | Feb. 1, 1955 |
| 2,811,590 | Doremus et al. | Oct. 29, 1957 |
| 2,816,283 | Steele | Dec. 10, 1957 |
| 2,820,855 | Sherr | Jan. 21, 1958 |
| 2,854,614 | Light | Sept. 30, 1958 |
| 2,862,109 | Kruper | Nov. 25, 1958 |